US006478357B2

(12) United States Patent
Zhou

(10) Patent No.: US 6,478,357 B2
(45) Date of Patent: Nov. 12, 2002

(54) AUTOMATIC DOOR OPERATING DEVICE

(75) Inventor: Zhenjia Zhou, Yokohama (JP)

(73) Assignee: Ohi Seisak Usho Co., Ltd., Kanagawa (JP)

( * ) Notice: Subject to any disclaimer, the term of this patent is extended or adjusted under 35 U.S.C. 154(b) by 0 days.

(21) Appl. No.: 09/962,080

(22) Filed: Sep. 26, 2001

(65) Prior Publication Data

US 2002/0040551 A1 Apr. 11, 2002

(30) Foreign Application Priority Data

Sep. 27, 2000 (JP) ....................................... 2000-294849

(51) Int. Cl.[7] ............................................... B62D 25/00
(52) U.S. Cl. ........................................... 296/56; 49/139
(58) Field of Search ........................... 49/139, 140, 25; 296/56

(56) References Cited

U.S. PATENT DOCUMENTS

| | | | | |
|---|---|---|---|---|
| 3,716,945 A | * | 2/1973 | Cooper et al. | 49/139 |
| 4,945,677 A | * | 8/1990 | Kramer | 49/139 |
| 5,448,856 A | | 9/1995 | Moore et al. | |
| 5,851,050 A | * | 12/1998 | Squire et al. | 49/140 |
| 6,145,917 A | | 11/2000 | Ishii et al. | |
| 6,185,868 B1 | * | 1/2001 | Kato | 49/339 |
| 6,226,925 B1 | * | 5/2001 | Shimura et al. | 49/139 |

FOREIGN PATENT DOCUMENTS

| | | |
|---|---|---|
| JP | 6-71852 | 10/1994 |
| JP | 2000-335245 A | 12/2000 |
| JP | 2001-132325 A | 5/2001 |
| JP | 2001-132326 A | 5/2001 |
| JP | 2001-132327 A | 5/2001 |

* cited by examiner

*Primary Examiner*—Jerry Redman
(74) *Attorney, Agent, or Firm*—Sughrue Mion, PLLC

(57) ABSTRACT

An automatic door operating device drives a door for a pivotal movement in accordance with a switch operation. The automatic door operating device includes a handle disposed on the door; and a controller. The controller allows the door to be manually operable for the pivotal movement when the handle is operated during a time the door is in a process of being driven for the pivotal movement.

8 Claims, 3 Drawing Sheets

AUTOMATIC DOOR OPERATING DEVICE

BACKGROUND OF THE INVENTION

1. Field of the Invention

The present invention relates to an automatic door operating device for opening and closing a door in accordance with a switch operation.

2. Description of the Related Art

Conventionally, there is provided an automatic door operating device for opening and closing a door by means of a drive source such as an electric motor, in accordance with a switch operation. The conventional automatic door operating device has a function of stopping the door from a pivotal movement (open and close), by turning off the electric motor. In this case, the above stop function is triggered by pressing an operation button disposed on a vehicular body or by pulling a handle mounted on the door, during the time the door is in the process of being driven for the pivotal movement by means of the electric motor.

However, the above conventional automatic door operating device has only the function described sequentially as follows:

1. When the door is in the process of being driven for the pivotal movement, the operation button is operated (pressed or pulled) so as to stop the door from the pivotal movement.

2. The electric motor is turned off.

3. The thus turned off electric motor stops the door from the pivotal movement.

Therefore, with the door thus stopped, there remains a transmission system (for transmitting a drive force for the pivotal movement) intervening between the door and the electric motor. The above summarizes that, when the door is thus stopped, the door cannot be manually operated (opened or closed) due to the transmission system.

For solving the problem of the above conventional automatic door operating device, there is proposed another type of automatic door operating device. This another type of automatic door operating device has a clutch gear intervening in the transmission system for the pivotal movement of the door. For achieving the manual operation of the door, the clutch gear is turned off. This another type of automatic door operating device uses the following two types of switches for the pivotal movement of the door, and for turning off the clutch gear: One is a switch disposed in the vicinity of a driver. The other is a keyless switch remotely operable from a position away from the vehicular body (In other words, the keyless switch is operable from a position remote from the door.).

The following two operations are stationed in completely different positions from each other. One is a switch operation of turning off the clutch gear for allowing the manual operation by stopping the door which is in the process of being driven for the pivotal movement. The other is the manual operation of manually opening and closing the door that has been stopped from the pivotal movement. The above complete difference in position makes it impossible to carry out the above two operations continuously, in other words, to allow the door to quickly become manually operable (open and close) soon after the door has been stopped from the pivotal movement.

BRIEF SUMMARY OF THE INVENTION

It is therefore an object of the present invention to provide a convenient automatic door operating device which quickly becomes, when necessary, manually operable (open and close) soon after the door has been stopped from a pivotal movement (open and close) by means of a drive source.

According to the present invention, there is provided an automatic door operating device for driving a door for a pivotal movement in accordance with a switch operation. The automatic door operating device comprises a handle disposed on the door; and a controller. The controller allows the door to be manually operable for the pivotal movement when the handle is operated during a time the door is in a process of being driven for the pivotal movement.

The other objects and features of the present invention will become understood from the following description with reference to the accompanying drawings.

DETAILED DESCRIPTION OF THE PREFERRED EMBODIMENT

Figure 1:
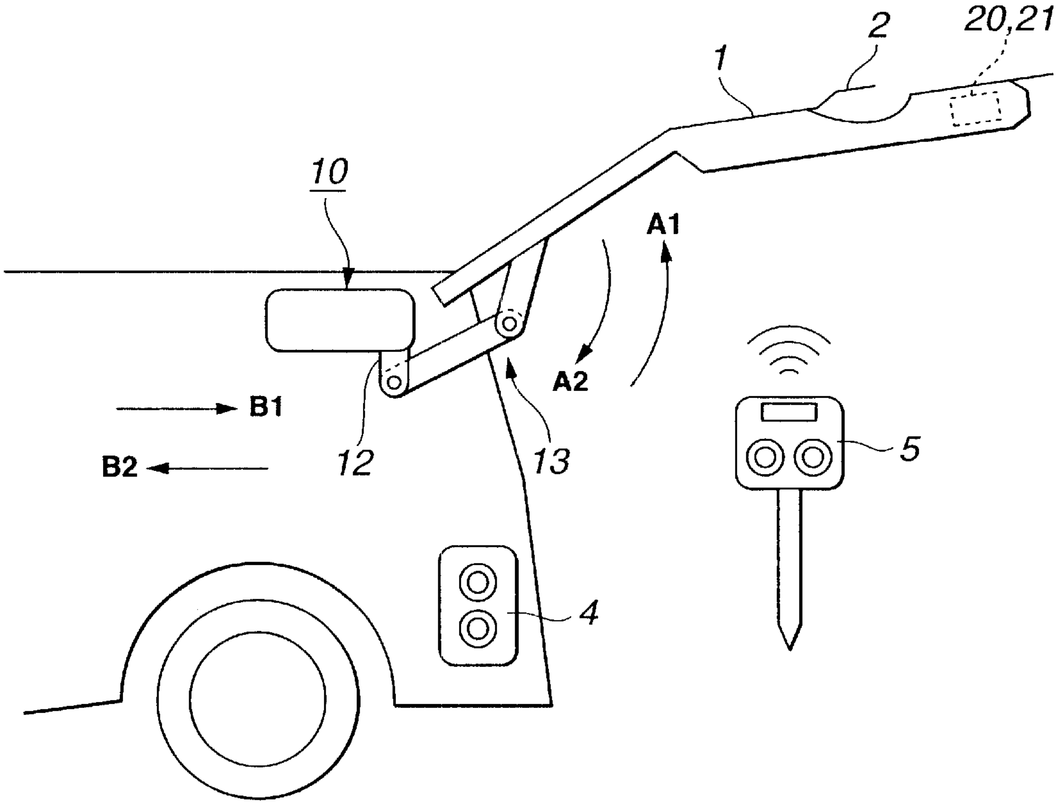
FIG. 1 is a schematic of a motor vehicle with a back door 1 opened, in which the motor vehicle is equipped with an automatic door operating device under the present invention.
Figure 2:
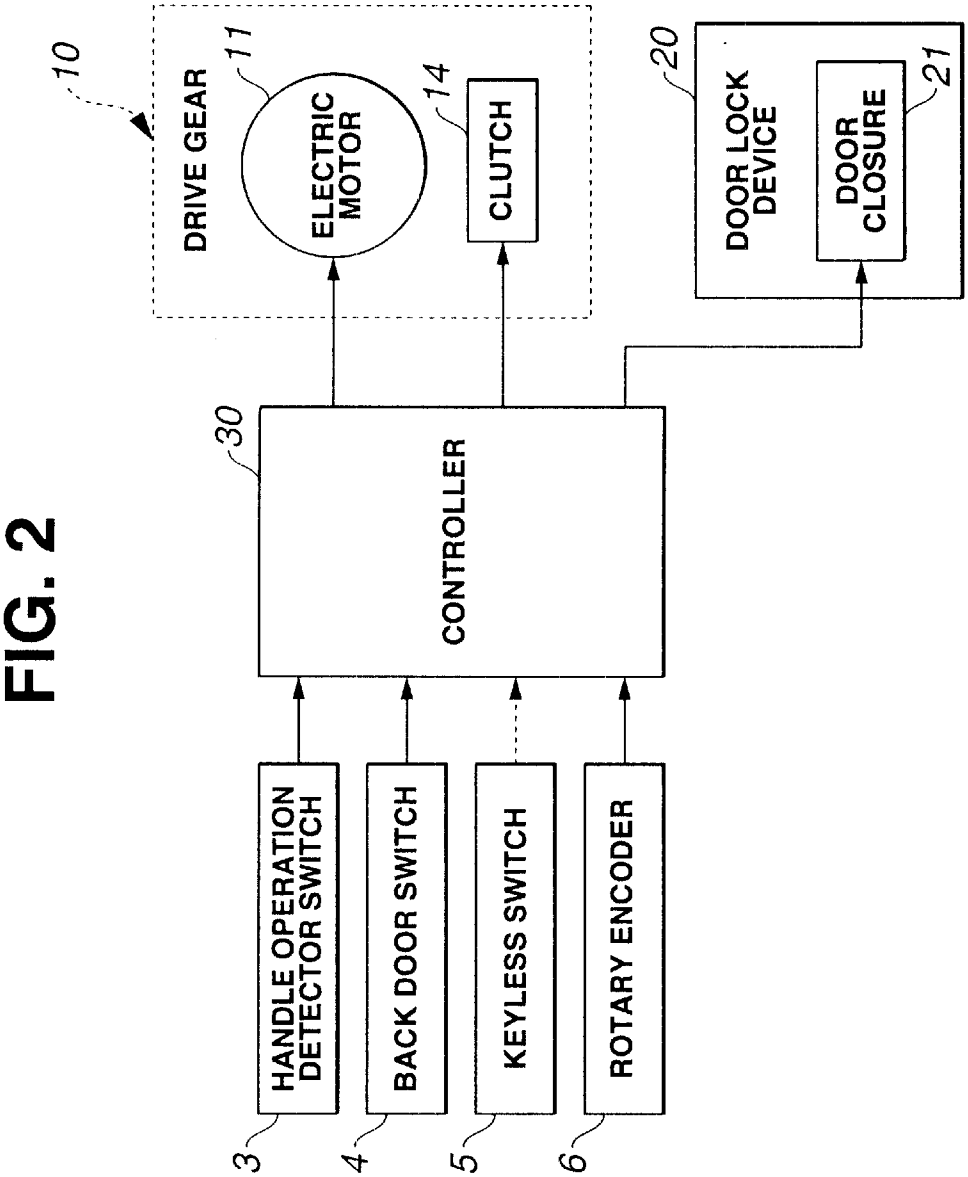
FIG. 2 is a block diagram of a control system of the automatic door operating device FIG. 1.
Figure 3:
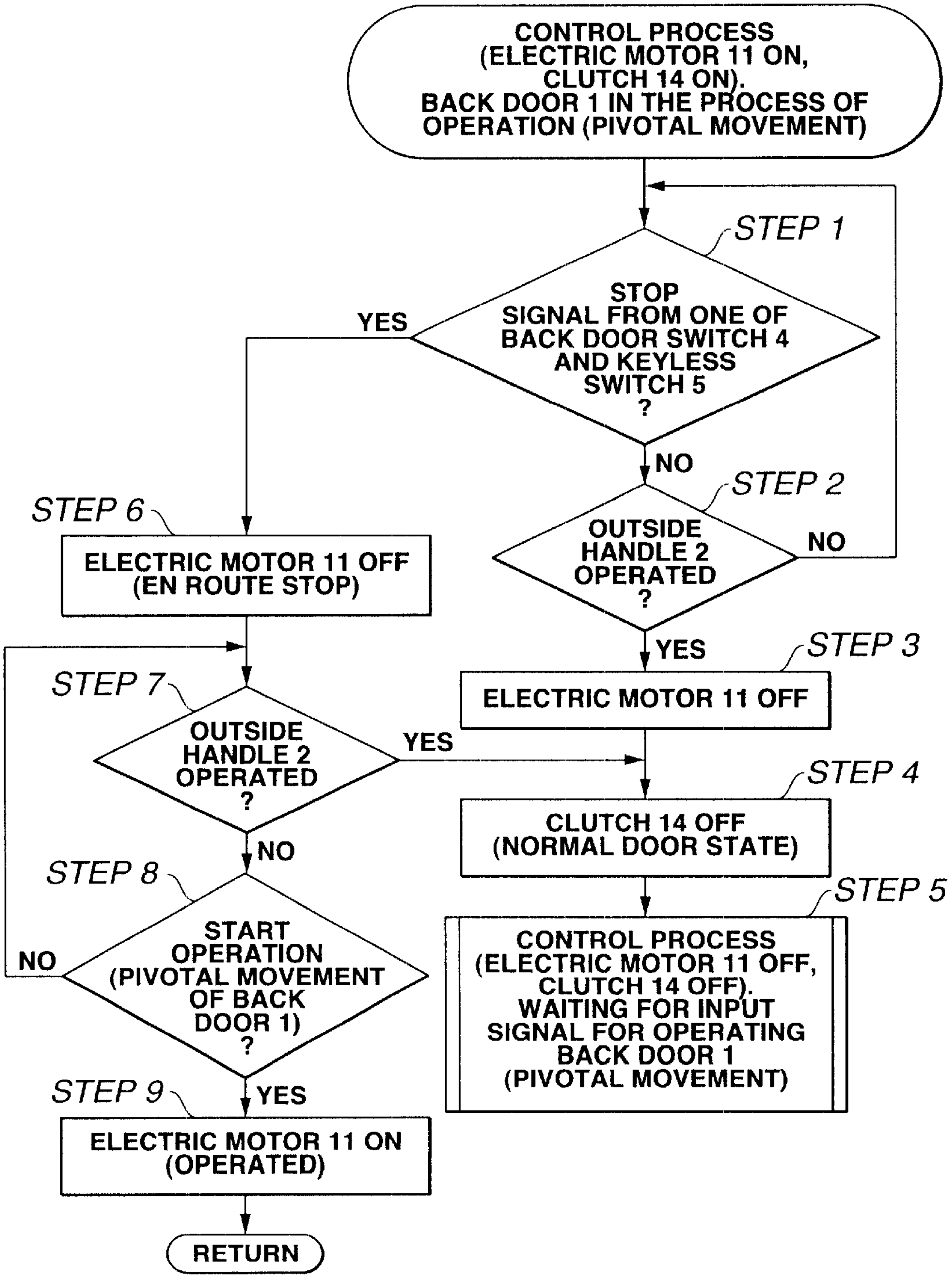
FIG. 3 is a flowchart showing a control process by means of a controller 30 in FIG. 2 when the door is in the process of being driven for a pivotal movement (open and close) by means of a drive source.

As is seen in FIG. 1 to FIG. 3, there is provided an automatic door operating device for a back door 1 of a motor vehicle, according to a preferred embodiment of the present invention.

FIG. 1 shows a schematic showing the back door 1 of the motor vehicle equipped with the automatic door operating device, according to the preferred embodiment of present invention. At an upper end of a rear part of the motor vehicle, there is provided the back door 1 which is rotatable in an opening direction A1 and a closing direction A2. There is provided an outside handle 2 on an outer surface of the back door 1. The outside handle 2 is pulled when the back door 1 is manually opened and closed.

There is provided a drive gear 10 on an upper and rear side of the motor vehicle. The drive gear 10 is driven by an electric motor 11 (FIG. 2), and opens and closes the back door 1. The drive gear 10 according to the preferred embodiment is equipped with a slider 12 sliding in a first direction B1 and a second direction B2 (opposite to the first direction B1) corresponding to a rotational direction of the electric motor 11. There is provided a link gear 13 linking the slider 12 to the back door 1. Turning the electric motor 11 in a first direction allows the slider 12 to slide in the first direction B1, to thereby open the back door 1 in the opening direction A1. On the other hand, turning the electric motor 11 in a second direction (opposite to the first direction) allows the slider 12 to slide in the second direction B2, to thereby close the back door 1 in the closing direction A2.

Moreover, there is provided a drive force transmission system between the electric motor 11 and the slider 12. As is seen in FIG. 2, there is shown a clutch 14 which intervenes in the drive force transmission system. The clutch 14 acts as a controller for connection and cut-off (ON/OFF control). When the clutch 14 is turned off, the drive force transmission system between the electric motor 11 and the slider 12 is cut off, to thereby allow the back door 1 to be manually operable.

As is seen in FIG. 1, at substantially a right end (opposite to a free end [left end] and a vehicular body) of the back door 1, there is provided a door lock device 20 having an ordinary constitution. As is seen in FIG. 2, a door closure 21 is incorporated in the door lock device 20, according to the preferred embodiment.

As is seen in FIG. 2, the drive gear 10 and the door lock device 20 are controlled by a controller 30. The controller 30 receives an input signal from a handle operation detector switch 3, a back door switch 4, a keyless switch 5, and a rotary encoder 6. The handle operation detector switch 3 detects that the outside handle 2 on the back door 1 is pulled. As is seen in FIG. 1, the back door switch 4 is disposed in the vehicular body. The back door switch 4, in accordance with its switch operation, outputs a signal for opening and closing the back door 1, and outputs a signal for stopping the back door 1. On the other hand, the keyless switch 5, in accordance with its switch operation, outputs a signal from a position remote from the vehicular body. The keyless switch 5 outputs the signal by wireless. Like the back door switch 4, the signal of the keyless switch 5 is for opening and closing the back door 1, and is for stopping the back door 1. The rotary encoder 6 detects an open position and a closed position of the back door 1.

Described hereinafter is in terms of an operation of the automatic door operating device, according to the preferred embodiment of the present invention.

When the back door 1 is fully closed, the door lock device 20 locks the back door 1 in a full-closed position. In the full-closed state, one of the back door switch 4 and the keyless switch 5 is so operated as to open the back door 1 (hereinafter referred to as “opening switch operation”). Otherwise, pulling the outside handle 2 inputs an opening signal (for opening the back door 1) into the controller 30 from one of the handle operation detector switch 3, the back door switch 4, and the keyless switch 5. With the opening signal thus inputted into the controller 30, the controller 30 actuates a release actuator of the door lock device 20, to thereby lock the back door 1 in the opening position. Thereafter, the clutch 14 of the drive gear 10 is turned on (connected), to thereby turn the electric motor 11 in the first direction. Thereby, the back door 1 starts opening. The back door 1 opens to such an extent that the back door 1 is in the vicinity of a full-open position. At this point in time, when the rotary encoder 6 detects the back door 1, the electric motor 11 is turned off (stop rotation) and the clutch 14 is also turned off (cut off). As a result, the back door 1 is in a full-open state, as is seen in FIG. 1.

Thereafter, one of the back door switch 4 and the keyless switch 5 is so operated as to close the back door 1 (hereinafter referred to as “closing switch operation”). A closing signal for closing the back door 1 is inputted into the controller 30 from one of the back door switch 4 and the keyless switch 5. With the closing signal thus inputted into the controller 30, the controller 30 turns on the clutch 14 of the drive gear 10 (connected), to thereby turn the electric motor 11 in the second direction. Thereby, the back door 1 starts closing. The back door 1 closes to such an extent that the back door 1 is in the vicinity of a half-latch position. At this point in time, when the rotary encoder 6 detects the back door 1, the electric motor 11 is turned off (stop rotation) and the clutch 14 is also turned off (cut off). Then, the door closure 21 of the door lock device 20 is driven. The door closure 21 automatically pulls in the back door 1 from the half-latch position to a full-latch position. As a result, the back door 1 is locked again in the full-closed position.

The controller 30 controls the drive gear 10 in accordance with i) the opening switch operation and the closing switch operation (of the back door switch 4 and the keyless switch 5) and ii) a pulling operation (of the outside handle 2), when the back door 1 is in the process of being driven for the pivotal movement (open and close) by means of the electric motor 11, in other words, when the electric motor 11 and the clutch 14 are turned on.

As is seen in FIG. 3, there is provided a flowchart showing how the controller 30 controls (namely, control process) when the back door 1 is in the process of being driven for the pivotal movement (open and close) by means of the electric motor 11.

The controller 30 takes the following sequential steps:

Step 1

Determine whether one of the back door switch 4 and the keyless switch 5 is operated for stopping the back door 1, in other words, whether the signal for stopping the back door 1 is inputted into the controller 30 or not from one of the back door switch 4 and the keyless switch 5. If NO, the routine moves to step 2.

Step 2

Determine whether the outside handle 2 is pulled or not, in other words, whether a detection signal from the handle operation detector switch 3 is inputted into the controller 30 or not. If YES, the routine moves to step 3.

Step 3

The electric motor 11 is turned off (stop rotation).

Step 4

Then, the clutch 14 is turned off. As a result, the back door 1 is manually operable (opened and closed), which is referred to as “normal door state.”

When the back door 1 in the process of being driven for the pivotal movement (open and close) by means of the electric motor 11 is instantly changed into the normal door state by pulling the outside handle 2, the back door 1 quickly becomes manually operable (open and close). Thereby, the back door 1 prevents entanglement of a baggage and the like.

After the back door 1 is in the normal door state, the routine moves to step 5.

Step 5

The controller 30 waits for the opening signal or the closing signal to be inputted from one of the back door switch 4 and the keyless switch 5 so as to open or close the back door 1 by means of the electric motor 11. When receiving the opening signal, the controller 30 turns on the clutch 14 followed by turning the electric motor 11 in the first direction; while when receiving the closing signal, the controller 30 turns on the clutch 14 followed by turning the electric motor 11 in the second direction.

On the other hand, if YES at step 1, the routine moves to step 6.

Step 6

The controller 30 turns off the electric motor 11, to thereby stop the back door 1 en route in the present position. At this point in time, the clutch 14 is kept turned on. Therefore, a load of a drive system between the back door 1 and the electric motor 11 does not allow the back door 1 to be in the normal door state, to thereby keep the back door 1 in the present position (en route stop). Thereafter, the routine moves to step 7.

Step 7

Determine whether the outside handle 2 is pulled or not.

If YES at step 7, the routine moves to step 4, to thereby turn off the clutch 14 (normal door state).

If NO at step 7, the routine moves to step 8.

Step 8

Determine whether one of the back door switch 4 and the keyless switch 5 is operated for opening or closing the back door 1 (starting operation).

If YES at step 8, the routine moves to step 9.

If NO at step 8, the routine moves to step 7.

Step 9

The electric motor 11 is turned on for driving the back door 1 in accordance with the operation (open or close). More specifically; when one of the back door switch 4 and the keyless switch 5 is operated to open the back door 1, the electric motor 11 is turned in the first direction; while when one of the back door switch 4 and the keyless switch 5 is operated to close the back door 1, the electric motor 11 is turned in the second direction. Thereby, the back door 1 recovers the operation of the pivotal movement (open and close) driven by means of the electric motor 11.

Although the present invention has been described above by reference to the preferred embodiment, the present invention is not limited to the preferred embodiment described above. Modifications and variations of the embodiments described above will occur to those skilled in the art, in light of the above teachings.

More specifically for example, the drive gear 10 is not limited to the one described above in terms of constitution. All that are required of the drive gear 10 is opening and closing the back door 1 by means of a drive source such as the electric motor 11 and the like, and changing the back door 1 into the normal door state by means of the clutch 14 and the like.

Moreover, for changing the back door 1 into the normal door state, the minimum requirement is turning off the clutch 14. In other words, turning off the electric motor 11 is not a must.

Another example. Like the back door switch 4 and the keyless switch 5, the handle operation detector switch 3 is allowed to be so constituted as to open and close the back door 1, and as to stop the back door 1, in accordance with the operation of the outside handle 2.

Furthermore, the drive gear 10 may build in the door lock device 20.

Finally, the present invention is applicable to various types of doors other than the back door of the motor vehicle. Included in such types of doors are a slide door, a trunk lid and the like.

The entire contents of basic Japanese Patent Application No. P2000-294849 (filed Sep. 27, 2000) of which priority is claimed is herein incorporated by reference.

The scope of the present invention is defined with reference to the following claims.

What is claimed is:

1. An automatic door operating device for driving a door for a pivotable movement in accordance with a switch operation, the automatic door operating device comprising:

a door driving mechanism operable for driving the door;

a handle disposed on the door; and a controller operative to detect handle operation and disengage the door driving mechanism, whereby the controller allows the door to be manually operable for the pivotal movement when the handle is operated during a time the door is in a process of the pivotal movement.

2. An automatic door operating device for driving a door for a pivotal movement in accordance with a switch operation, the automatic door operating device comprising:

a handle disposed on the door; and a controller for allowing the door to be manually operable for the pivotal movement when the handle is operated during a time the door is in a process of being driven for the pivotal movement, in which the automatic door operating device further comprises:

a drive gear comprising:

a drive source for driving the door for the pivotal movement, the door and the drive source constituting a transmission system therebetween the transmission system for transmitting a drive force for driving the door for the pivotal movement, and a clutch intervening in the transmission system;

wherein the controller turns on the drive source and the clutch for the pivotal movement of the door; and the controller turns off at least the clutch of the drive gear when the handle is operated during the time the door is in the process of being driven for the pivotal movement.

3. The automatic door operating device as claimed in claim 2 further comprising a switch for stopping the door, in which the controller takes the following sequential steps:

when the switch is operated during the time the door is in the process of being driven for the pivotal movement, the controller turns off the drive source, leaving the clutch turned on, and when the handle is operated, the controller turns off the clutch.

4. The automatic door operating device as claimed in claim 3, in which the switch is one of a door switch which is so disposed in a motor vehicle as to output a signal for the pivotal movement of the door, and a keyless switch which outputs, by wireless, the signal for the pivotal movement of the door from a position remote from the motor vehicle.

5. The automatic door operating device as claimed in claim 1, in which the door is a back door of a motor vehicle; and the handle is an outside handle disposed outside the back door.

6. A motor vehicle having a door which is, at an upper end of the door, pivotally connected proximate to a rear end of a roof of the motor vehicle, the motor vehicle comprising:

an automatic door operating device for opening and closing the door in accordance with a switch operation, the automatic door operating device comprising:

a door driving mechanism operable for driving the door;

a handle disposed on the door; and a controller operable to detect handle operation and disengage the door driving mechanism, whereby the controller allows the door to be manually operable for the pivotal movement when the handle is operated during a time the door is in a process of being driven for the pivotal movement.

7. A motor vehicle having a door which is, at an upper end of the door, pivotally connected to a rear end of a roof of the motor vehicle, the motor vehicle comprising:

an automatic door operating device for opening and closing the door in accordance with a switch operation, the automatic door operating device comprising:

a handle disposed on the door; and a controller for allowing the door to be manually operable when the handle is operated during a time the door is in a process of being driven for one of an opening operation and a closing operation, in which the door is a back door of the motor vehicle;

the automatic door operating device further comprises:

a drive gear comprising:

an electric motor for opening and closing the door, the door and the electric motor constituting a transmission system therebetween, the transmission system transmitting a drive force for opening and closing the door, and a clutch intervening in the transmission system;

the controller turns on the electric motor and the clutch for opening and closing the door; and the controller turns off at least the clutch of the drive gear when the handle disposed on an outer surface of the door is operated during the time the door is in the process of being driven for one of the opening operation and the closing operation.

8. The motor vehicle as claimed in claim 7 further comprising a switch for opening, closing and stopping the door, in which the switch comprises:

a door switch which is so disposed in the motor vehicle as to output a signal for opening and closing the door, and a keyless switch which outputs, by wireless, the signal for opening and closing the door from a position remote from the motor vehicle; and the controller takes the following sequential steps for stopping the door:

when one of the door switch and the keyless switch is operated during the time the door is in the process of being one of the opening operation and the closing operation, the controller turns off the drive source, leaving the clutch turned on, and when the handle is operated, the controller turns off the clutch.

* * * * *